8918X
NO PRINTED SPECIFICATION AVAILABLE
J. Card.
Smut Mill.
Patented Jun. 20, 1835.
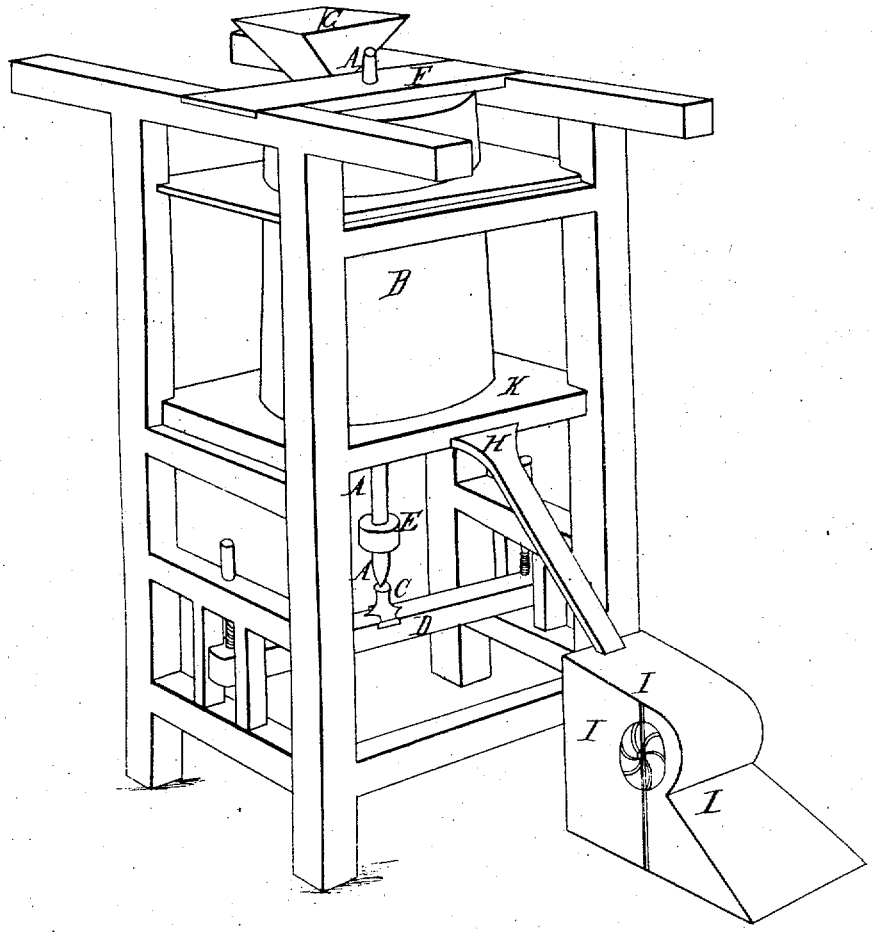

June 20. 1835 507

8918X

John Card, of Gainsville, State of New York, —

Letters Patent.

The Schedule referred to in these Letters Patent, and making
part of the same, containing a description in the words of the
said John Card himself of his improvement in the Smut Mill
called the Elastic accelerating Smut Mill —

To all to whom these presents shall come,
Be it known, that I John Card of the town of Gainsville in the
County of Genesee, and State of New York, have invented a new
and useful improvement in the Smut Mill called the Elastic
Accelerating Smut-Mill, and that the following is a full
and exact description thereof, 1st This mill consists of a cylinder
through which a shaft passes, and to which shaft the cylinder is hung
or attached, and upon which it revolves, the shaft being perpendicular
which shaft is represented in drawing A, accompanying this Specifica
tion by the letter A, the cylinder is designed to be two feet and four
inches in length and eighteen inches in diameter at the bottom and
fifteen inches in diameter at the top, or such other length or size
as may best suit the builder, each end of the cylinder is covered
with sheet iron, thickly perforated, the rough side placed out,
The surface of the cylinder is designed to be covered with a card
or cards, formed by placing small nails about half an inch in
length into or driving them through firm and substantial harness
leather or thin and firm sole leather, or any other suitable
elastic substance. The nails are to be placed or driven through
the leather or other substance, at a point one fourth, of an inch dis
-tant from each other, the nail to be used in the construction
of said card or cards, may be represented by the numbers ten
twelve, or fourteen of "saddle tacks," usually so called cut off at
the point, so as to remain about half an inch in length, — And

8918X all nails manufactured expressly for making said cards, should
correspond in size and proportion thereto, The cards are designed
to be made about three inches wide, and placed upon the cy-
linder by winding the same around the cylinder in the form of a
screw, and nailing the same at proper distances and round so as
to cover entirely the whole surface of the cylinder, The nails
should be driven through or placed in the narrow strips of lea-
ther or other substance above mentioned, in regular rows, or
nearly so, one fourth in an inch apart, and the nails in each
row to be about that distance from each other, which rows
should vary about twenty two and a half degrees from a line
directly across said strips of leather, or other substance in
which said nails are placed, or the said nails may be driven
or placed in such other manner or order as ~~to~~ shall be deemed best
calculated to promote the object designed, The said cylinder
may also be constructed, and by me has been constructed in
the following manner, that is to say, The ends of the cylinder
to be constructed & covered in the manner ~~first~~ above described and
the surface of said cylinder instead of being covered by the card
above mentioned to be covered with circular plates, or staves
adapted to the size of the cylinder which plates or staves are
made of cast iron, one fourth of an inch thick, the convex
or outside of which plates or staves is covered with points or spurs
cast with, & being a part of the said plates or staves, which points
or spurs are one fourth of an inch square at the plate, or stave, and from one sixth to one fourth an inch in length, and tapering
regularly from the said plates, or staves to a point and to
be square their whole length, which points or spurs should be so
set upon the plates, or staves that in the revolution of the cy
linder each point or spur shall move cornerwise, or with one corner
in front, The points or spurs should also be so arranged, that
the sides thereof, at the plate or stave, shall be at equal dis-
tance apart from each other & which distance should be
about, one eighth and one sixteenth part of an inch, said staves or plates reach from one end of the cylinder to the other and are fastened firmly thereto, with screws, and iron bands, at the top and bottom thereof.

2nd. The cylinder constructed in either of the ways above des=cribed and attached to or hung upon, the perpendicular shaft "A," above mentioned, is designed to revolve within a sheet iron concave, thickly perforated with a small round punch so constructed as to cut out a small piece of the sheet iron in making each hole, each hole to be too small to admit a kernel of wheat to pass through and the holes to be as near each other as the strength of the iron will admit, The holes should be punched from the outside of the concave, so as to leave the inside thereof rough. The concave is represented in draw-ing "A," by the letter "B" and is designed to be stationary The difference between the diameter of the top and bottom of the concave, is designed to correspond with the difference between the diameters of the top and bottom of the concave, is designed to correspond with the difference between the diameters of the top and bottom of the cylinder, The cylinder is designed to revolve within the said concave "B." in such manner that the extremities of the nails points or spurs shall not in the revolutions of the cylinder approach nearer than one quarter of an inch to the inside surface of the sheet iron concave "B" nor pass in the revolutions of said cylinder at a distance greater than one half an inch from said inside surface, but to revolve in such intermediate space, as shall be best calculated to accomplish the object of the machine, which distance may be varied at pleasure by raising or lowering the cylinder by means of screws, entering the ends of the bridge tree "D" upon which rests the lower end of the perpendicular shaft "A," which shaft is made of iron or steel, and to be of such size and length, as shall be most desirable, and to stand in an iron or metalic Box or oil pot, fastened in the bridge tree

8918X

"D" which box or oil pot is represented in said drawing A, by the letter "C." the said cylinder is propelled by a strap or band passing from the propelling power around a pulley or wheel attached to said perpendicular shaft, "A," which said pulley or wheel, is represented in said drawing "A." by the letter "C." It being designed that the said cylinder of the size above described, when constructed by being covered with the elastic card first above herein described, shall perform six hundred revolutions, or thereabouts in each minute and when said cylinder is constructed by being covered with the cast iron plates or strips above described, between seven and eight hundred revolutions should be performed in each minute, 3.d The perpendicular iron shaft "A." is supported and held at the top by a bridge tree, represented in said drawing "A." by the letter "F," or in such other way as the nature of the frame in which the cylinder and concave may be placed shall make it most convenient, the said cylinder and concave may be placed in a common frame represented in drawing "A" or fastened firmly to a building or put up in any other convenient manner, The grain which this machine is designed to clean from smut or filth, enters the mill at the hopper "G" (see drawing "A") and passes thence into the aperture between the concave "B." and the said cylinder while in motion and is discharged thence through the spout, H, (as represented in drawing "A") into a common fanning mill, or a wind mill constructed for the purpose and attached to the frame as represented by the letter "I." in drawing "A." K, represents a space or box below, the concave "B." into which the grain falls from the space between the said cylinder, and concave, and from which it passes into the spout H, and in order to prevent the grain from passing through the floor of said space or box "K" a circular guard or partition formed by two semicircles attached to different parts of the floor, to said box "K" being the two (581)

8918X middle part thereof, said floor being formed of four equal
boards or parts, which two semicircles when put together forming one
entire circle, around the hole in said floor thereof, which the
shaft "A." passes and which circle so made entire being of the
height of two inches and one half of an inch above the bottom
floor to said space or box, K. should enter into a circular
groove in the bottom of said cylinder, to a suffecent extent
to admit of said cylinder being raised or lowered as above men-
tioned and still to allow the said circular guard or partition to
remain in said circular groove, In order to put in operation
the machinery or Mill herein above particularly described,
and of the dimentions stated, a frame about four or five
feet high, and from two feet and three inches, to three feet
square, would be of a proportionate size, What I claim as my
own invention & not previously known in the above described
Machine, is the manner of constructing the cylinder in the two
different ways herein above specified, together with the principles
of the operation of the said machine, it requiring less power to
propel it & being used with greater safety (being less liable to
generate heat) than any machine of the kind heretofore known
or used, And I also claim as my own invention & not hereto
-fore known or used the manner of constructing the concave
herein above mentioned Witnesses
He D. M. Kay
E. A. M Kay John Card (Drawing)

836 words

15